UNITED STATES PATENT OFFICE.

ALBERT MARX, OF BALTIMORE, MARYLAND.

MEDICAL COMPOUND FOR DYSPEPSIA, &c.

SPECIFICATION forming part of Letters Patent No. 375,173, dated December 20, 1887.

Application filed May 11, 1887. Serial No. 237,853. (No specimens.)

*To all whom it may concern:*

Be it known that I, ALBERT MARX, of Baltimore, in the State of Maryland, have invented a new and useful Composition of Matter, of which the following is a specification.

My composition consists of the following ingredients, combined substantially in the proportions stated, viz: water-pepper, tops and flowers, (*Polygonum punctatum*,) six ounces; ginger-root, white, the root, (*Zinziber officinalis*,) four ounces; garden melisse, balm, the whole plant, (*Dracocephalum canar*,) eight ounces; peppermint, the tops of plant, (*Mentha piperita*,) six ounces; pennyroyal, the tops of plants, (*Hedeoma pulegioides*,) six ounces; lobelia, seeds and tops, even parts, (*Lobelia inflata*,) three ounces; rosemary, the tops, (*Cistus*,) three ounces; cramp-bark, the bark, (*Viburnum opulus*,) three ounces; golden seal, the root, (*Hydrastis Canadensis*,) six ounces; bloodroot, the root, (*Sanguinaria Canadensis*,) two ounces; prickly ash, bark and berries, even parts, (*Xanthoxylum fraxineum*,) six ounces; wahoo, the bark, (*Euonymus atropurpureus*,) six ounces; capsicum, cayenne pepper, the tincture, (*Capsicum annuum*,) three drams; sweet scented golden rod, the whole plant, (*Solidago odora*,) eight ounces; horse-radish, grated, the root, (*Cochlearia armoracia*,) eight ounces; malt from barley, prepared barley malt, (*Maltum hordei*,) twelve ounces; hops the cores, (*Humulus lupulus*,) four ounces; celery, grated, the roots, (*Apium graveolens*,) twelve ounces. Addition of flavoring ingredients: caraway-seeds, anise-seed, fennel-seed, coriander-seed, and cloves, of each two ounces; orris-root, two ounces.

The above ingredients in a crude state are reduced by any suitable means to a coarse powder, then placed in a suitable vessel, and four gallons of double-rectified Cologne spirits is poured over them and macerated from eight to ten days. The contents of the vessel are now poured into a copper apparatus, not unlike a still, and run over in about three hours. By this operation I receive about three gallons of pure clear mixture, to which are added thirty-seven gallons of fine whisky reduced to a medical standard. It is sedative, tonic, diuretic, and alterative in its properties.

Dose and time of repetition: In severe attacks of cholera-morbus, cramp, and colic, a table-spoonful should be taken every half-hour until relieved. In the less violent forms a table-spoonful every two hours will be sufficient. As a preventive during the prevalence of cholera, a table-spoonful may be taken three times a day, after meals; in cases of summer complaint in children, ten to fifteen drops.

My compound will also be found useful as a bitters in cases of dyspepsia, general debility, and in derangements of the liver and kidneys.

What I claim as new, and desire to secure by Letters Patent, is—

The herein-described composition of matter to be used as a medicine, consisting of water-pepper, root-ginger, garden melisse, peppermint-leaves, pennyroyal, lobelia inflata, rosemary, cramp-bark, golden seal, bloodroot, prickly-ash bark, wahoo-bark, capsicum, sweet scented golden rod, horse-radish, malt, hops, and celery, (grated,) substantially in the proportions specified.

ALBERT MARX.

Witnesses:
FREDERICK N. TRALL,
JOSIAH S. SHOWACRE.